Patented Mar. 7, 1950

2,499,847

UNITED STATES PATENT OFFICE 2,499,847

3 CHLORO, 2,2 DIMETHYL PROPYLAMINE AND PROCESS OF PREPARING

Oliver W. Cass, Niagara Falls, N. Y., assignor to E. I. du Pont de Nemours & Company, Wilmington, Del., a corporation of Delaware No Drawing. Application July 6, 1946, Serial No. 681,775

4 Claims. (Cl. 260—583)

This invention relates to the production of chloro neopentyl amine (1-chloro-2,2-dimethyl-3-amino propane), and more particularly it relates to the production of chloro neopentyl amine by reacting monochloro trimethyl acetonitrile (1-chloro-2-cyano-2-methyl propane) with hydrogen. This reaction may be represented by the following equation:

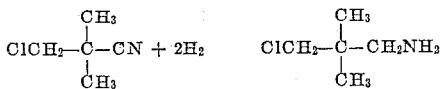

This is a continuation-in-part of my copending application Serial No. 557,373, filed October 5, 1944 and now abandoned.

The above-said hydrogenation reaction may be carried out by passing hydrogen into monochloro trimethyl acetonitrile, with or without a diluting solvent, at an elevated temperature and a superatmospheric pressure in the presence of nickel as a catalyst.

The monochloro trimethyl acetonitrile used in carrying out the process of the present invention may be produced by the chlorination of trimethyl acetonitrile. Trimethyl acetonitrile may be advantageously prepared as disclosed in the copending application Serial No. 521,666 of C. R. Harris et al., filed February 9, 1944 and now abandoned. The chlorination of trimethyl acetonitrile to produce monochloro trimethyl acetonitrile is preferably carried out by passing chlorine gas into trimethyl acetonitrile at a temperature of between 70° C. and 165° C. in the presence of actinic radiation which may be provided by a light source, for example, a tungsten filament light bulb, a carbon arc light, a mercury vapor light, or the like. The chlorine is passed into the trimethyl acetonitrile until the total weight of chlorine to total weight of the acetonitrile corresponds with the molecular proportion of chlorine to acetonitrile necessary to produce the monochloro trimethyl acetonitrile.

Preferably, the chlorination of trimethyl acetonitrile is carried out in a glass-lined reactor which is provided with a jacket for heating, or cooling, as desired, with an agitator, with an appropriate inlet line through which chlorine may be introduced, with a thermocouple well, with a reflux condenser leading to an absorption system for the absorption of the hydrogen chlorine evolved during the reaction, and with a series of glass wells into which sources of light, as desired, may be inserted. Additional details of this process are disclosed in my co-pending application Serial No. 580,701, filed March 2, 1945, now Patent No. 2,425,029.

The hydrogen will react with the monochloro trimethyl acetonitrile in the presence or absence of a diluting solvent. The diluting solvent may be composed of any organic solvent which will dissolve the acetonitrile but which is inert, i. e., will not enter into substantial reaction with the acetonitrile or the hydrogen, under the conditions of the reaction. The said acetonitrile may, for example, be dissolved in diethyl ether, cyclohexane, ethanol, decalin or n-hexane before carrying out the hydrogenation reaction.

The reaction, in order to be practical, should be carried out at a temperature of at least 80° C. and a pressure of at least 1000 lbs. per sq. in. The temperature may, however, be as high as, or even higher than, 200° C. There is probably no upper limit to the pressure which may be used, however, for practical purposes there would be little to be gained by using a pressure above 5000 lbs. per sq. in.

The nickel catalyst may be used alone as substantially pure nickel, or it may be supported on an inert catalyst support. Preferably, the nickel catalyst is produced in the conventional manner by reduction of nickel oxide.

The following example is given to illustrate a preferred process for carrying out the present invention, it being understood, of course, that the invention is not to be limited to the specific details set forth in this example. For example, the use of a diluent, diethyl ether as disclosed, or the presence of ammonia as disclosed are not essential to the process of the invention. The ammonia is present for the purpose of removing traces of hydrochloric acid which may be present.

Example I 236 parts of monochloro trimethyl acetonitrile together with 200 parts diethyl ether as a diluent, 24 parts of a catalyst comprising reduced nickel supported on finely divided kieselguhr and containing 35% by weight nickel, and one part anhydrous ammonia were charged into a pressure vessel. This mixture was heated in said vessel, with stirring, to a temperature of 125° C. Hydrogen was then passed into the vessel at a pressure of 2000 lbs. per sq. in. Hydrogen was rapidly absorbed and the pressure was maintained by the addition of more hydrogen. After absorption of hydrogen had ceased, the pressure vessel and contents were cooled to room temperature and the pressure released. The catalyst was filtered from the product, and the chloro neopentyl amine was isolated by fractional distillation. A good yield of the chloro neopentyl amine was obtained.

The chloro neopentyl amine obtained distilled at 85–87° C. at 100 mm. pressure. The neutral equivalent was 123.7 which closely approaches the theoretical neutral equivalent of 121.5 for this compound. The actual chlorine content of the chloro neopentyl amine obtained was 28.1% and 28.2% whereas the theoretical chlorine content of this compound is 29.2%. The actual nitrogen content found was 11.9% and 11.7% whereas the theoretical nitrogen content is 11.5%.

The chloro neopentyl amine is a colorless oil which is soluble in water to give a strongly basic solution. It has a typical aliphatic amine odor.

That the reaction of the present invention will take place without loss of the chlorine content of the molecule is considered to be surprising. Furthermore, the hydrogenation of an aliphatic chloride containing groups which are readily hydrogenated, such as ethylenic linkages, cyano or ketone groups is customarily impossible with a nickel catalyst due to the very rapid poisoning of the nickel by the chlorine. If hydrogenation of this type of compound is carried out, ordinarily it results in the elimination of the chlorine as hydrogen chloride so that the hydrogenated product does not contain chlorine.

It is, therefore, particularly unexpected that hydrogenation of chloro trimethyl acetonitrile proceeds readily and smoothly with a nickel catalyst to give good yields of the chloro neopentyl amine. The chloro neopentyl amine is of substantial utility in synthetic work as it combines two highly reactive groups in the alpha omega positions.

Throughout the specification and claims, parts and percentages referred to are to be taken as parts and percentages by weight, unless otherwise specified.

Since it is obvious that numerous changes and modifications can be made in the above-described details without departing from the nature and spirit of the invention, it is to be understood that the invention is not to be limited except as set forth in the appended claims.

I claim:

1. A process for the production of 1-chloro-2,2-dimethyl-3-amino propane which comprises passing hydrogen into contact with 1-chloro-2-cyano-2-methyl propane in the presence of nickel at a temperature between 80° C. and 200° C. and at a pressure between 1000 lbs. and 5000 lbs. per square inch.

2. A process for the production of 1-chloro-2,2-dimethyl-3-amino propane which comprises passing hydrogen into contact with 1-chloro-2-cyano-2-methyl propane in the presence of an inert diluting solvent and nickel at a temperature between 80° C. and 200° C. and at a pressure between 1000 lbs. and 5000 lbs. per square inch.

3. A process for the production of 1-chloro-2,2-dimethyl-3-amino propane which comprises passing hydrogen into contact with 1-chloro-2-cyano-2-methyl propane in the presence of diethyl ether and nickel at a temperature between 80° C. and 200° C. and at a pressure between 1000 lbs. and 5000 lbs. per square inch.

4. 1-chloro-2,2-dimethyl-3-amino propane.

OLIVER W. CASS.

REFERENCES CITED

The following references are of record in the file of this patent:

UNITED STATES PATENTS

| Number | Name | Date |
|---|---|---|
| 2,346,492 | Knight et al. | Apr. 11, 1944 |

FOREIGN PATENTS

| Number | Country | Date |
|---|---|---|
| 490,922 | Great Britain | Aug. 16, 1938 |

OTHER REFERENCES

Beilstein, Organische Chemie 4 ed. vol. IV p. 175, (1923).

Walter et al., J. Am. Chem. Soc., vol. 56 pp. 1614–1616 (1934).

Magidson et al., Chemical Abstracts, vol. 28 p. 3477 (1934).

Balandin et al., Chemical Abstracts, vol. 30 pp. 6277 (1936).

Mannich et al., Ber. Deut. Chem., vol. 70 pp. 210–213 (1937).

Migrdichian, Organic Cyanogen Compounds, (Reinhold Pub. Co., New York 1947) p. 164.